United States Patent [19]

Lalonde et al.

[11] Patent Number: 4,675,670

[45] Date of Patent: Jun. 23, 1987

[54] APPARATUS FOR THE DYNAMIC AND NON-CONTACT MEASUREMENT OF SMALL DISTANCES

[75] Inventors: Francois Lalonde, Varennes; Jean Marc Bourgeois, Longueuil; Marius Cloutier, Boucherville, all of Canada

[73] Assignee: Hydro Quebec, Montreal, Canada

[21] Appl. No.: 660,082

[22] Filed: Oct. 12, 1984

[30] Foreign Application Priority Data

Dec. 14, 1983 [CA] Canada .................................. 443276

[51] Int. Cl.[4] ...................... G01R 27/26; G01B 7/14; G01L 3/10
[52] U.S. Cl. .............................. 340/870.37; 324/61 R; 324/61 P
[58] Field of Search ...................... 33/363 Q; 364/571; 340/870.37; 73/437; 177/210 C; 324/61 P, 61 R

[56] References Cited

U.S. PATENT DOCUMENTS

| | | | |
|---|---|---|---|
| 3,651,505 | 3/1972 | Schmidt | 340/870.37 |
| 3,729,991 | 5/1973 | Hardway | 340/870.37 |
| 3,860,918 | 1/1975 | Cencel | 340/870.37 |
| 3,986,109 | 10/1976 | Poduje . | |
| 4,058,765 | 11/1977 | Richardson | 340/870.37 |
| 4,086,528 | 4/1978 | Walton | 324/61 R |
| 4,159,747 | 7/1979 | Realini | 364/571 |
| 4,190,797 | 2/1980 | Lecklider et al. . | |
| 4,288,741 | 9/1981 | Dechene | 324/61 R |
| 4,311,959 | 1/1982 | Riessland | 324/61 P |
| 4,347,478 | 8/1982 | Heerens | 324/61 P |
| 4,372,405 | 2/1983 | Stuart | 73/437 |
| 4,568,873 | 2/1986 | Oyanagi | 324/61 P |

FOREIGN PATENT DOCUMENTS

| | | |
|---|---|---|
| 640273 | 4/1962 | Canada . |
| 1673841 | 9/1972 | Fed. Rep. of Germany .... 324/61 P |
| 2496871 | 6/1982 | France . |
| 58-162802 | 9/1983 | Japan . |
| 2023847 | 1/1980 | United Kingdom . |
| 2071852 | 9/1982 | United Kingdom .............. 324/61 P |
| 2131176 | 1/1984 | United Kingdom . |

Primary Examiner—Gerard R. Strecker
Assistant Examiner—Jose M. Solis
Attorney, Agent, or Firm—Schwartz, Jeffery, Schwaab, Mack, Blumenthal & Evans

[57] ABSTRACT

A method and an apparatus for the dynamic and non-contact measurement of the distance separating the surface of a first part that may be conductive or not, from the surface of at least one second conductive part closely spaced from the first conductive part. The method resides in positioning, on the surface of the first part, at least one sensor including two conductive plates that are parallel, superimposed and electrically insulated from one another. The two plates of this at least one sensor are then fed with a same high frequency signal under the same voltage and the current generated by this high frequency signal, between the plate of the sensor which is closest to the surface of the second conductive part and this second conductive part, is measured. This measured current varying as an inverse function of the distance separating the surface of the second conductive part from the surface of the sensor which is closest to this second conductive part, it is then easy to determine the value of the distance separating the first and second conductive parts as a function of the value of the measured current. This method as well as the apparatus for carrying it out are particularly well adapted for measuring the air gap in any type of rotating machine such as an electric generator.

29 Claims, 7 Drawing Figures

APPARATUS FOR THE DYNAMIC AND NON-CONTACT MEASUREMENT OF SMALL DISTANCES

The present invention relates to an apparatus as to a method for the dynamic and non-contact measurement of the distance separating the surface of a first part from the surface of at least one second conductive part closely spaced from the first one.

A particular object of the present invention lies in an apparatus as well as in a method for the dynamic and non-contact measurement of small distances, which apparatus and method may advantageously be used for measuring, in a permanent and relatively simple manner, the air gap of any rotating machine such as an electric or hydroelectric generator.

It is well known to specialists that the dynamic measurement of the air gap in a generator may be obtained only in exceptional situation, considering the elaborate means that have to be resorted to in order to obtain such a measure. Most of known methods used for measuring the air gap call for photographic and optic techniques which require a relatively important space for the installation of the measuring system. This need for space, which usually requires that the generator be opened, results in that measurement of the air gap can only be made sporadically so that a permanent control becomes impossible although such a control would be highly useful to avoid, for instance, contacts between the rotor and the stator in the case of a generator.

Another known method for measuring the air gap calls for distance sensors of which the operating principles are based on the measure of eddy currents or yet on the use of the Hall effect. By their very principle of operation, these types of sensors are therefore automatically disturbed in the magnetic field. Again, this type of sensors cannot be used to measure the air gap during normal operating conditions of an electric generator. Besides, the readings of such sensors are often modified by the metal laminations, apart from being ill-adapted for direct installation in the air gap of a rotary machine.

An object of the present invention is to provide an apparatus as well as a method for measuring the distance separating the surface of two conductive parts closely spaced from one another, which apparatus and method avoid the various disadvantages mentioned above.

More specifically, the present invention relates to an apparatus as well as to a method for the dynamic and non-contact measurement of the distance separating the surface of a first part that may be conductive or not, from the surface of a second part that is conductive and closely spaced one from the other, such as are the stator and rotor of an electric generator, which apparatus and method may be used in a permanent manner without making important changes nor requiring an excessive space. In the particular case of an electric generator, the apparatus and the method of the invention may be permanently installed in the air gap without making important changes to the generator nor requiring excessive space while providing accurate and reliable results even in intensive magnetic fields.

The apparatus and the method according to the invention make accessible, through their advantages, the study of rotating machines starting from an air gap measurement, for all operating conditions of the said machines.

The apparatus according to the invention for the dynamic and non-contact measurement of the distance separating the surface of a first part that is conductive or not, from the surface of at least one second conductive part, is characterized in that it comprises:

at least one sensor including two parallel, superimposed conductive plates electrically insulated from one another, this sensor being positioned from the very surface of said first part which may, for instance, be the stator of a generator, in such a way that the two plates be parallel to the said surface and electrically insulated therefrom;

means for feeding the two plates of the sensor with a same high frequency signal, preferably comprised between 100 kHz and 100 MHz, under the same voltage which may be comprised between 5 and 100 volts;

means for measuring the current generated by the high frequency signal between the plate of the sensor closest to the surface of the second conductive part, which may be the poles of the rotor of the generator, and the latter second conductive part, said measured current varying as an inverse function of the distance separating the surface of the second conductive part from the surface of the plate of the sensor which is closest to the second conductive part; and processing means for determining the value of the distance separating the first part from the second conductive part as a function of the value of the measured current.

As indicated, the apparatus according to the invention comprises means for measuring the electric current generated by a high frequency signal between the plate of the sensor which is closest to the second conductive part and the latter. The intensity of the current thus measured is given by the following equation:

$$i = \omega C V$$

wherein:

$\omega = 2\pi f$, f being the frequency of the emitted signal,

V is the difference in voltage between the plate of the sensor which is closest to the surface of the second conductive part and the latter, and C is the capacity of the space separating the plate of the sensor which is closest to the surface of the second conductive part and the latter, which capacity is inversely proportional to the linear distance separating the said plate closest to the surface of the second conductive part and the latter.

As can easily be gathered, the greater is the frequency of the signal feeding the sensor and the greater is the voltage, the greater will the generated current be and will be easily detectable.

In practice, the signal used to generate the current will preferably be selected so that its frequency be comprised between 100 kiloHertz and 10 megaHertz. If the signal frequency is below this range, the intensity of the current may become too small to be easily measurable and it then becomes impossible, because of the reduced frequency bandwidth, to measure the signal dynamically. Besides, in the particular case of generators, too low a frequency may cause noises. If, on the other hand, the frequency is too high and is beyond the aforementioned range, there may arise a measuring problem, the amplifiers that make it possible to treat signals at high frequency becoming more and more complicated. Furthermore, too high a frequency may create ground impedance problems.

Theoritically, the voltage applied across the plates of the sensor must likewise be as large as possible to generate a strong current signal. Preferably, the voltage will nevertheless be limited to a value comprised between 5 and 100 volts peak-to-peak, because the use of a voltage too far beyond 100 volts may cause insulation problems.

Whatever be the case, the above equation clearly illustrates that, for a given sensor, the detected current is, in first approximation, an inverse function of the distance separating the plate of the sensor which is closest to the second conductive part, from the said second conductive part.

With an adequate calibration made at the construction of the sensor to take into account the non-linearity of its measurement, it is possible to determine the value of the distance between the sensor and the second conductive part as a function of the value of the measured electric current. This determination takes into account the various physical parameters of each type of the sensor. The relationship between the currents and distances can be preprogrammed in a computer so that the distance separating the first part on which the sensor is positioned from the second conductive part be easily found from the value of the current measured by the sensor in use.

Preferably, the means for measuring the current generated by the high frequency signal comprise a small impedance mounted in series between the means feeding the high frequency signal and the plate of the sensor which is closest to the second conductive part. An insulating circuit is connected to the small impedance to measure the high frequency voltage signal between its terminals and to extract from this measured signal a signal proportional to the measured current. This insulating circuit may comprise, for example, an insulating transformer, an amplifier, a filter and an amplitude demodulator all mounted in series.

As can easily be understood from the preceding remarks, the manner of operating the sensor used in the apparatus according to the invention makes it independent of the type of conductive surfaces from which the distance is expected. The apparatus according to the invention is thus not affected by laminations.

Furthermore, the sensor which is made up of two conductive plates separated one from the other by an insulating material, may be manufactured in such a way as to have the smallest volume as possible. This makes it easily mountable in a rotating machine to measure its air gap. By its structure, the sensor used in the apparatus according to the invention may be installed in existing machines without any modification of the latter.

In fact, the use of the apparatus according to the invention is not limited to electric generators since, in theory, this apparatus makes it possible to measure the distance between the sensor and any other conductive wall.

The method according to the invention for the dynamic and non-contact measurement of the distance separating the surface of a first part from the surface of a second conductive part closely spaced from said first part, is characterized in that it comprises the steps of:
positioning, on the surface of the first part, at least one sensor as described above;
feeding the two plates of this sensor with a same high frequency signal under the same voltage;
measuring the current generated by the said high frequency signal between the plate of the sensor which is closest to the surface of the second conductive part and the said second conductive part, and
determining the value of the distance extending between the first part and the second conductive part as a function of the value of the measured current.

Here again, this method is not limited to electric generators since it makes it possible to measure the distance between the sensor and any conductive part.

The invention as well as its various advantages will be better understood from the non-restrictive description that follows of a preferred embodiment, description having reference to the appended drawing wherein.

Figure 1:
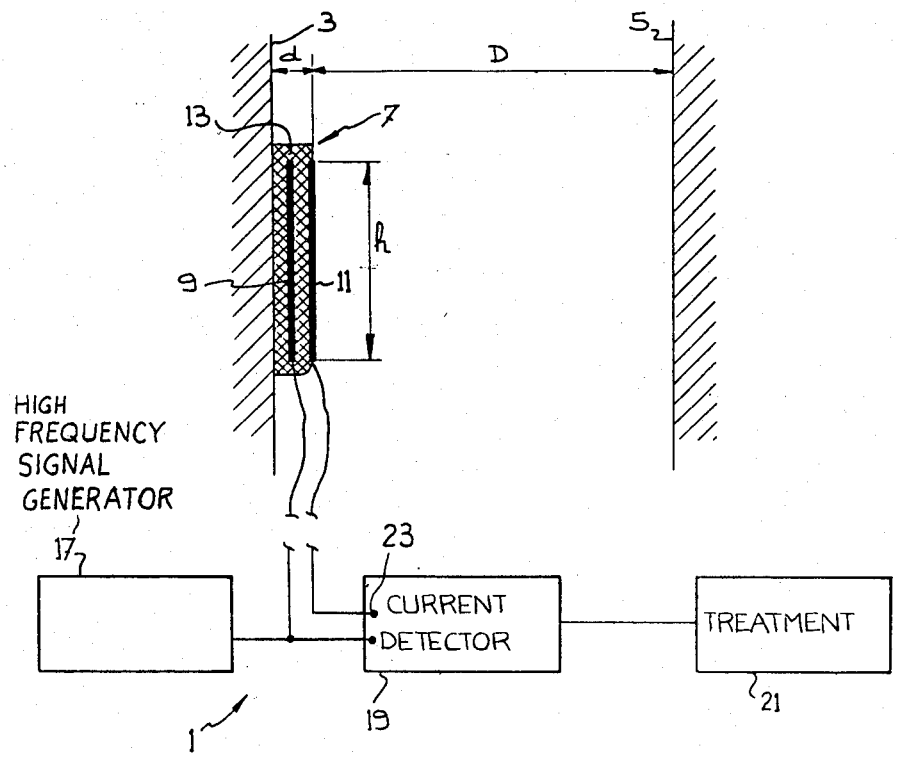
FIG. 1 is a diagram illustrating the principle of the apparatus according to the invention.

Referring now to FIG. 1 of the appended drawings, the apparatus 1 made according to the invention for the dynamic and non-contact measurement of small distances is intended for measuring the distance existing between the surface 3 of a first part, that may be conductive or not, such as, for example, the surface of a stator of an electric generator, and the surface 5 of at least one second conductive part closely spaced from the first one. The second part that must be conductive may, for instance, be a pole of a rotor of an electric generator in the case where the part 3 is a stator. It is proper however to specify that the apparatus according to the invention may indifferently be used in one sense or the other, that is for measuring the distance separating the stator from the rotor or, inversly, the distance separating the rotor from the stator of a generator.

The apparatus 1 made according to the invention comprises at least one sensor 7 made up of two plates 9 and 11 which are conductive, parallel, superimposed and electrically insulated from one another by means of an appropriate insulation material 13. The sensor 7 is designed to be positioned on the very surface 3 of the first part so that the two plates 9 and 11 be parallel to this surface and electrically insulated therefrom. This insulation may be carried out, as illustrated, by the insulation material 13 already used for electrically insulating the plates 9 and 11.

Figure 2:
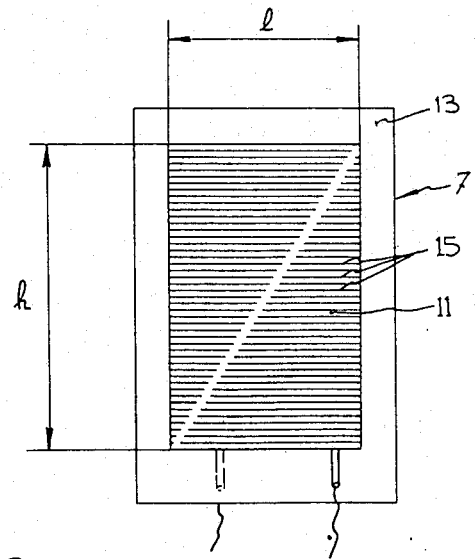
FIG. 2 is a plan view of the surface of a sensor used according to the invention for the measure of the air gap of an electric generator.

The positioning of the sensor on the very surface 3 may be achieved by simply gluing it or by any other appropriate means. When it is intended to mount the sensor 7 on an electric generator to measure the air gap of the latter, it is advantageous to groove the surface of the conductive plates 9 and 11 by means of grooves 15 so as to obtain comb-shaped surfaces as illustrated for instance in FIG. 2, in order to reduce eddy currents as much as possible. In order to reduce as much as possible parasitic currents, one may vary the size of the surface of the plates 9 and 11 by increasing one with respect to the other, or vary the distance that separates them, being understood that the smaller this distance, the smaller will the parasitic currents be. In all cases, it will nevertheless be necessary to determine the curve of linearisation of each sensor to accurately determine the value of the distance to be measured as a function of the value of the measured current signal.

The apparatus 1 made according to the invention, also comprises means to feed the two plates of the sensor with a same high frequency signal under the same voltage. These means may be constituted by a high frequency signal generator 17 operating within the range comprised between 100 kiloHertz and 10 megaHertz under a voltage comprised between 5 and 100 volts. Tests carried out by the inventors with 455 kiloHertz signals under a 10-volt potential have shown to be quite satisfactory.

The apparatus 1 made according to the invention, additionally comprises means 19 for measuring in isolated mode the current generated by the high frequency signal between the plate 11 which is closest to the surface 5 of the second conductive part and the latter.

The apparatus made according to the invention, finally comprises processing means 21 for determining the value of the distance separating the surface 3 of the first part from the surface 5 of the second conductive part as a function of the value of the measured current.

Figure 3:
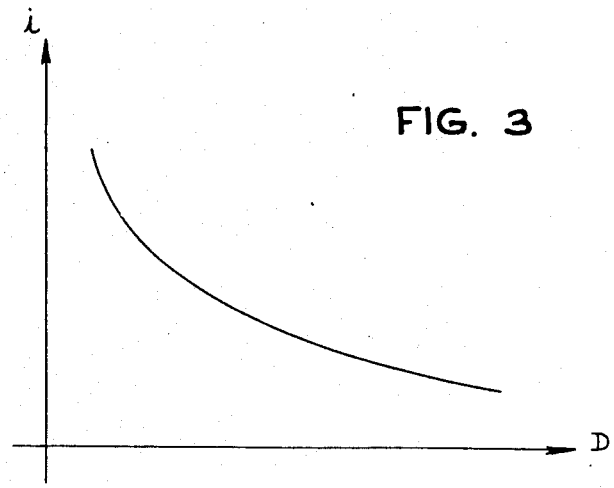
FIG. 3 is a curve showing the value of the measured current as a function of the distance that separates the sensor from the conductive plate which is opposite to it.

As previously explained, the value of the measured current varies as an inverse function of the distance that separates the surface 5 of the second conductive part from the surface 11 of the plate of the sensor which is the closest from this second conductive part. In theory, the value of the measured current should be inversely proportional to the distance separating the plate 11 from the surface 5. However, in practice, the value of the detected current is subject to numerous parallel effects, the curve i=f(v) being, as a first approximation, such as illustrated in FIG. 3. The processing apparatus 21 takes this into account the curve of linearization determined at the construction of each type of sensor in order to provide, for each measured value i of the measured current, the value of the distance d+D separating the surfaces 3 and 5.

According to the invention, it is essential that the sensor 7 be constituted by two conductive plates 9 and 11 electrically connected to the same generator through different paths. As previously indicated, the plate 11 closest to the surface 5 is exclusively used to achieve the desired measure, the current transducer 19 being mounted in series between the generator 17 and the said plate 11. The plate 9 has the essential function of serving as a mask for the plate 11 to avoid that the current generated by the high frequency signal between the sensor 7 and the surface 3 of the first part if this first part is conductive, completely distort the desired measure of the current generated between the plate 11 and the surface 5 of the second conductive part. Besides, this masking function explains why it is essential that the plates 9 and 11 be fed by the same high frequency signal under the same voltage. This function likewise explains why the choice of the insulating material 13 has absolutely no importance, provided that the desired electrical insulation is obtained.

Figure 4:
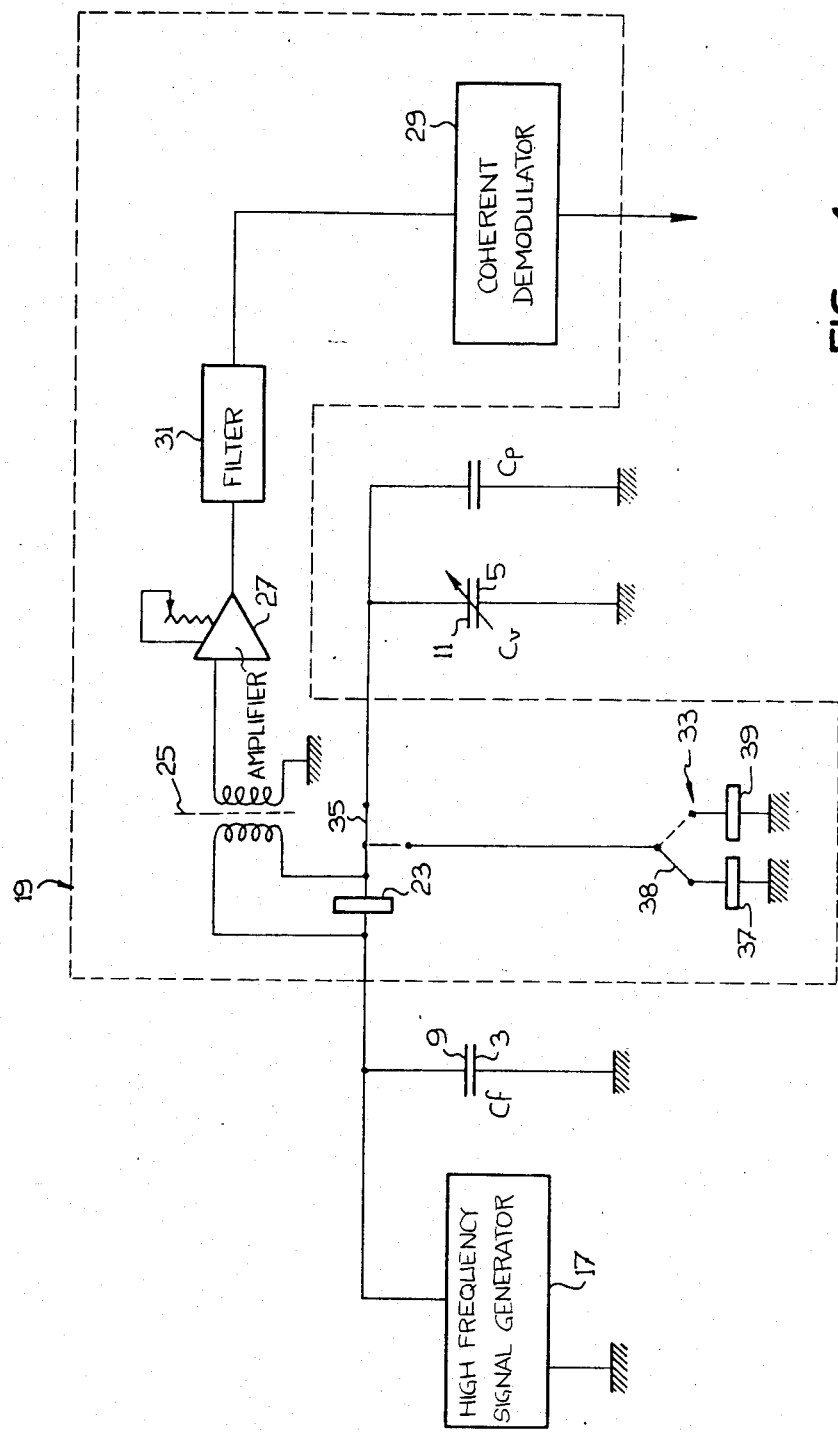
FIG. 4 is a diagram of the measuring, detection and calibration circuit used within the frame of the present invention.

FIG. 4 gives a diagram of a measurement, detection and correction circuit that can be used in the apparatus according to the invention. On this diagram, the high frequency signal generator 17 is again shown. This generator feeds the plate 9 which, along with the surface 3 of the first part, forms a fixed condensor Cf. The plate 11 forms, with the surface 5 of the second conductive part, a variable condensor Cv. Finally, there is a parasitic condensor which is proper to each type of sensor and this parasitic condensor is identified by the symbol Cp. The current transducer 19 is advantageously constituted by a small impedance 23 mounted in series between the generator 17 and the sensor plate 11 which is closest to the surface 5 of the second conductive part. The current transducer 19 likewise comprises an insulating circuit connected to the low impedance 23 to measure in an insulated manner the high frequency voltage signal at the terminals of this low impedance and to extract from this measured signal a signal proportional to the detected current. This circuit may comprise an insulating transformer 25 connected, on one side, to the terminals of the low impedance and, on the other side, to an adjustable gain amplifier 27. The amplifier 27 is connected to an amplitude demodulator of a known type 29 which receives the signal of the amplifier via a filter 31. The demodulator 29 outputs the requested signal proportional to the detected current and transmits it to the processing means 21 that will be described in greater details hereinafter. To obtain a quick and easy calibration of the apparatus, the current detector 19 may also incorporate calibration means 33 capable of replacing for a short period of time the variable condensor Cv. These calibration means that are connectable through a switch 35, may be made up by two impedances 37 and 39 of given values, making it possible to obtain two reference signals (high and low calibrations). These impedances 37 and 39 may be connected one after the other by means of a relay 38. It should be mentioned that the use of such calibration means 33 is relatively important to the extent that it allows, before each reading of data, taking into account same variations of the amplifier as well as the generator further to allowing an easy determination of the gain and offsets.

Figure 5:
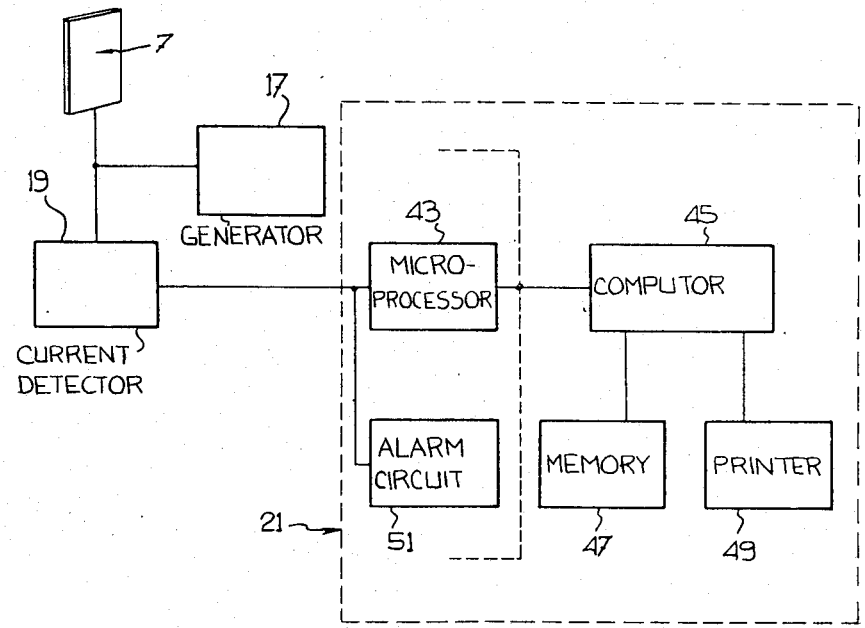
FIG. 5 is a block diagram illustrating the processing means of the apparatus according to the invention.

As illustrated in FIG. 5, the processing means 21 are fed by the sensor 7 via the current detector 19.

According to a first embodiment of the invention, these processing means 21 advantageously comprises a microprocessor 43 intended to store the current signals that are measured by the sensor 7 until they are required. When needed, the signals are then transmitted from the microprocessor 43 to a computer 45 which may be provided with external memory means 47 (disks or others) and visualization means 49 (printer or others). In the case where several sensors 7 are used, the computer 45 may be connected to the micro-processor 43 associated to each sensor 7 in such a way as to be able to process individually the signals memorized in each of the micro-processors 43 associated to each of the sensors 7. Dotted lines shown in FIG. 5 illustrate, by way of example, possible connections to other micro-processors 43. Getting the linearization data associated to each sensor into the computer to let it give the distance corresponding to the intensity of each measured current may be made in laboratory.

As previously indicated, it may be necessary to make a calibration prior to each data reading to take into account gain and offset variation of the amplifier and the generator.

According to another embodiment of the invention, the processing means 21 comprises an alarm circuit 51 that may be used alone or together with the above mentioned circuitry. The utility of this circuit 51 is to immediately give an alarm signal if the value of the measured current corresponds to a predetermined critical distance. The use of such an alarm circuit, which may be easily permanently connected is very advantageous mainly in the case of the continuous and permanent control of an electric generator or of any other machine.

EXAMPLE

A prototype of the apparatus according to the invention has been constructed and tested by the inventors on an electric generator for measuring its air gap. For this purpose, a comb-type plate sensor has been made and glued to the very stator of the generator without disassembling this rotor. The specifications of the sensor thus mounted and the conditions under which the tests have been carried out in different operating conditions were as follows.

Dimensions of the sensor: h=200 mm
   1=25 mm
   d=1 mm

Maximum temperature: 125° C.

Sampling rate: about 5,500 samples per second (approximately 47 samples per pole, the generator being at 60 Hertz)

Reading memorized: (about 30,000 samples)

First tested operating mode: memorization of all samples (about 650 poles)

Second tested operating mode: memorization of the minimum air gap for each pole (about 30,000 readings).

The tests thus carried out have made it possible to achieve a measurement having an overall accuracy of 1% at full scale over a range of 4 mm to 25 mm under different operating conditions. On this point, it is proper to mention that the results obtained under these different operating conditions were directly comparable from one test to the other thanks to the use of a synchronizing box which has made it possible to start the sampling exactly at the same location on the rotor. The tests thus carried out have further made it possible to observe that the measurements that were taken have not been influenced by any of the disturbances present in a generator such as the magnetic fields, the acceleration etc.

Figure 6:
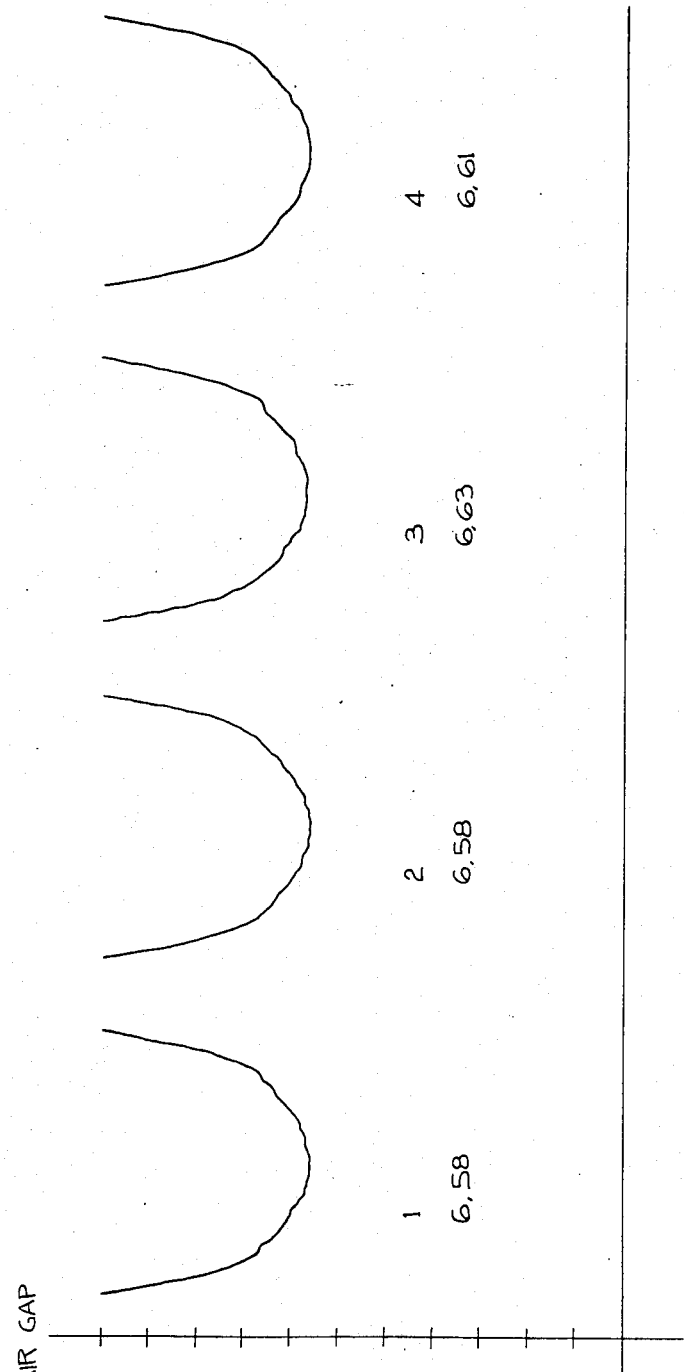
FIG. 6 is a diagram of the shape of several poles of the rotor of an electric generator with respect to a point on the stator of the same generator.
Figure 7:
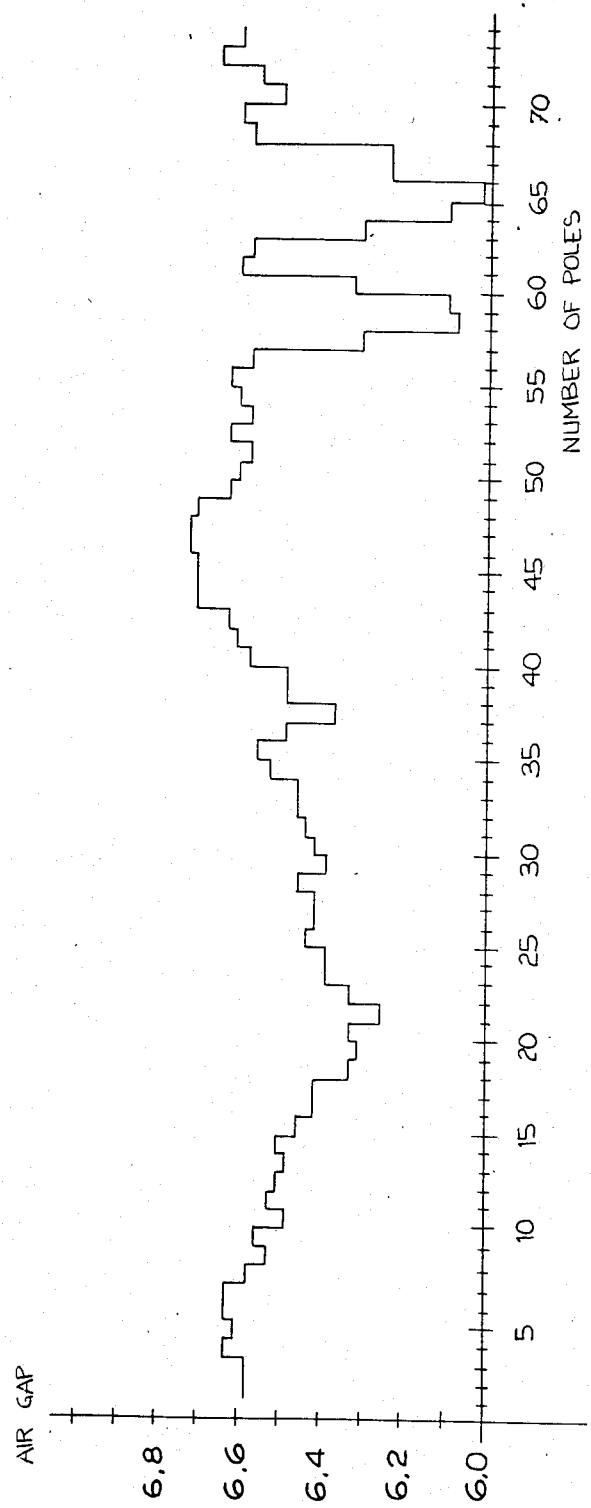
FIG. 7 is a diagram illustrating the minimum distance of each pole of a rotor with respect to a point on the stator of an electric generator.

FIG. 6 is a diagram giving the results obtained by the inventors who, in this particular case, were interested in the shape of the poles with respect to a point on the stator. FIG. 7 is a curve likewise giving the results obtained by the inventors. This curve gives the minimum distance separating the stator from the 74 poles of the rotor of the machine on which the apparatus was tested.

We claim:

1. Apparatus for non-contact measurement of the distance separating the surface of a first part from the surface of at least one second grounded conductive part closely spaced from said first part, characterized in that is comprises:
   at least one sensor including first and second parallel, superimposed conductive plates electrically insulated from one another, said sensor being positioned on the very surface of said first part in such a way that the said two plates are parallel to the said surface of said first part and electrically insulated therefrom;
   means for feeding said first plate of said sensor a high frequency signal;
   means for measuring the current generated by the said high frequency signal between the second plate of said sensor which is closest to the surface of said second conductive part, and the said second conductive part, said measured current varying as an inverse function of the distance separating the surface of said second conductive part from the surface of the second plate of said sensor which is closest to said second conductive part, including:
      an impedance mounted in series between said means for feeding said high frequency signal and the second plate of said sensor which is closest to said second conductive part, and
      an insulating circuit connected to said impedance for measuring in an insulated manner the high frequency voltage signal at the terminals of the impedance and extracting to the detected current; and
   processing means for determining the value of the distance separating said first part from said second conductive part as a function of the value of said measured current.

2. Apparatus according to claim 1, characterized in that the high frequency signal fed to said sensor has a frequency comprised between 100 kHz and 10 MHz.

3. Apparatus according to claim 1, characterized in that said high frequency signal applied onto said two plates has a voltage with values comprised between 5 and 100 volts.

4. Apparatus according to claim 1, wherein the high frequency signal fed to the first plate induces a voltage in the second plate with a voltage value substantially close to the voltage at the first plate, and the impedance is a low impedance.

5. Apparatus according to claim 1, characterized in that said insulating circuit comprises:
   an insulating transformer connected, on the one side, to the terminals of said impedance and, on the other side, to an amplifier, and
   an amplitude demodulator.

6. Apparatus according to claim 5, characterized in that the said amplifier is an adjustable gain amplifier and in that a filter is provided between said amplifier and said amplitude demodulator.

7. Apparatus according to claim 1, characterized in that the said processing means comprises a computer, pre-programmed as a function of the various physical parameters of said sensor, for determining the value of the actual distance corresponding to the value of the measured current signal for said sensor while taking into account parasitic effects which are proper to said sensor and which may affect the value of the said current signal thus measured.

8. Apparatus according to claim 7, characterised in that the said processing means further comprise a micro-processor connected between each of said detecting means and said computer for storing measured and conditioned current signals until they are supplied to the computer.

9. Apparatus according to claim 7, characterized in that the processing means further comprise:
   means for storing values determined by the computer; and means for visualizing the said values determined by said computer.

10. Apparatus according to claim 8, characterized in that said processing means further comprise:
an alarm circuit connected to the measuring means of each sensor in parallel to the micro-processor associated with said sensor, to immediately give an alarm signal if the value of the measured current corresponds to a predetermined critical value.

11. Apparatus according to claim 1, characterized in that said processing means comprise an alarm circuit to immediately give an alarm signal if the value of the measured current corresponds to a predetermined critical value.

12. Apparatus according to claim 1, characterized in that it comprises a single sensor.

13. Apparatus according to claim 1, characterized in that it comprises at least two sensors spaced one from the other on said first conductor part.

14. Apparatus according to claim 1, characterized in that said first and second conductive parts are the stator and the rotor of an electric generator, the measured distance being that of the air gap of said generator; and in that the surface of the plates of said sensor is grooved to obtain a comb-type surfacing reducing the production of eddy currents.

15. Apparatus as claimed in claim 8, characterized in that said first and second conductive parts are the stator and the rotor of an electric generator, the measured distance being that of the air gap of said generator; and in that the surface of the plates of said sensor is grooved to obtain a comb-type surfacing reducing the production of eddy currents.

16. Apparatus according to claim 11, characterized in that said first and second conductive parts are the stator and the rotor of an electric generator, the measured distance being that of the-air gap of said generator; and in that the surface of the plates of said sensor is grooved to obtain a comb-type surfacing reducing the production of eddy currents.

17. Apparatus according to claim 1, characterized in that the first and second conductive parts are the stator and rotor of an electric generator, the measured distance being that of the air gap of the said generator; and in that the high frequency signal used is 455 kHz signal under a peak-to-peak voltage equal to 10 v.

18. Apparatus according to claim 10, characterized in that the first and second conductive parts are the stator and rotor of an electric generator, the measured distance being that of the air gap of the said generator; and in that the high frequency signal used is 455 kHz signal under a peak-to-peak voltage equal to 10 v.

19. Apparatus according to claim 11, characterized in that the first and second conductive parts are the stator and rotor of an electric generator, the measured distance being that of the air gap of the said generator; and in that the high frequency signal used is 455 kHz signal under a peak-to-peak voltage equal to 10 v.

20. Apparatus according to claim 1, characterized in that it further comprises calibration means providing said processing means with reference signals.

21. Apparatus according to claim 5, characterized in that it further comprises calibration means providing said processing means, with reference signals.

22. Apparatus according to claim 6, characterized in that it further comprises calibration means providing said processing means with reference signals.

23. Method for non-contact measurement of the distance separating the surface of a first part from the surface of at least one second grounded conductive part closely spaced from said first part, characteried by the steps of:
positioning, on the surface of said first conductive part, at least one sensor including first and second parallel, superimposed conductive plates electrically insulated from one another, said plates being further parallel to said surface of said first part and electrically insulated therefrom;
feeding said first plate of said sensor a high frequency signal;
measuring the current generated by the said high frequency signal between the second plate of said sensor closest to the surface of said second conductive part and said second conductive part by placing an impedance in series between said means for feeding said high frequency signal and the second plate of said sensor which is closest to said second conductive part, connecting an insulating circuit to said impedance for measuring in an insulated manner the high frequency voltage signal at the terminals of the impedance, and extracting from said measured signal a signal proportional to the detected current, said measured current varying as an inverse function of the distance separating the surface of said second conductive part from the surface of the second plate of said sensor which is closest to said second conductive part; and
determining the value of the distance separating said first part from said second conductive part as a function of the value of said measured current.

24. Method according to claim 23, characterized in that said two plates are fed with a signal of which the frequency is comprised between 100 kHz and 10 MHz under voltage comprised between 5 and 100 volts.

25. The method according the claim 23, wherein the high frequency signal fed to the first plate induces a voltage in the second plate with a voltage value substantially close to the voltage at the first plate, and the impedance is a low impedance.

26. Method according to claim 23, characterized in that the determination of the value of the distance separating the first and second conductive parts as a function of the value of the measured current is carried out by means of a computer pre-programmed as a function of the various physical parameters of said sensor, to determine the value of the actual distance corresponding to the value of the current signal measured by said sensor while taking into account parasitic effects which are proper to said sensor and which may affect the value of the said current signal thus measured.

27. Method according to claim 23, characterized by the additional step of calibrating the apparatus with calibration means connected to the computer thereof, prior to making each current measurement.

28. Method according to claim 23, characterized in that:
the first and second conductive parts are the stator and the rotor of an electric generator, the distance measured being that of the air gap of the said generator; and in that the surface of the plates of the sensor is grooved to reduce the production of eddy currents.

29. Method according to claim 23, characterized in that:
the first and second conductive parts are the stator and the rotor of an electric generator, the distance measured being that of the air gap of the said generator; and in that the high frequency signal used is a 455 kHz signal under a peak-to-peak voltage of 10 volts.

* * * * *